United States Patent Office 2,922,794
Patented Jan. 26, 1960

---

2,922,794

5,6-DICHLOROBENZOXAZOLINONE-2 AND 5,6-DICHLOROBENZOTHIAZOLINONE-2

Ernst Model, Basel, and Jakob Bindler, Riehen, near Basel, Switzerland, assignors to J. R. Geigy A.G., Basel, Switzerland No Drawing. Application August 22, 1958
Serial No. 756,515

Claims priority, application Switzerland July 20, 1955

2 Claims. (Cl. 260—304)

The invention concerns new fungicidal agents.

It has been found that chlorinated benzazole compounds of the general formula:

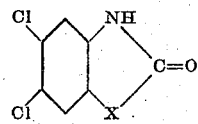

have valuable fungicidal properties and are therefore excellently suitable for the protection of organic material from attack by fungi and from damage due to rot. In this formula, X represents a divalent oxygen or sulphur atom. The tautomeric forms are also considered as being embraced by this formula, which forms are obtained by the removal of hydrogen from the nitrogen atom in the ring to O of the =C=O, as well as the salts of these tautomeric forms, in particular the alkali metal salts or also the ammonium salts.

The new compounds are obtained for example from o-aminophenols chlorinated in the ring on reacting with phosgene as well as from o-aminothiophenols chlorinated in the ring on reacting with phosgene. It is also possible to introduce the chlorine only subsequently, e.g. in 2,3-dihydrobenzoxazole-2-ones having a free 6-position. In general, the new compounds are colorless to weakly yellowish bodies which are mostly slightly soluble in hot water. The alkali metal salts, e.g. the lithium, sodium and potassium salts, also the magnesium or calcium salts as well as the ammonium salts of strong inorganic or organic nitrogen bases are much more easily soluble. Because of this solubility and their relatively good stability to alkalies the chlorinated benzene compounds usable according to the present invention can be incorporated into textile treatment liquors, in particular capillary active washing liquors which can contain, apart from the synthetic detergents and/or as well as soaps in the customary meaning of the word, also, the usual fillers such as sodium carbonate, sodium silicates and alkali mono- and poly-phosphates as well as other ingredients usual in washing agents. They can be mixed direct with such washing and cleansing agents as well as with soaps and with cleansing agents so composed that washing liquors are obtained which protect the material treated from attack or injury by fungi. The sufficient solubility of the active ingredients in organic solvents such as are used in so-called dry cleaning, enables them to be used in dry cleaning agents which consist of aliphatic or aromatic hydrocarbons which may be chlorinated, and generally also in those containing potassium salts of anion active wetting and cleansing agents which are soluble in oil. They can also be used in the production of the so-called sprays. They can also be mixed into paper treatment liquors or printing thickeners consisting of starch or cellulose derivatives or they can be used for impregnating wood. Also polyvinyl chloride preparations, e.g. sheets as well as lacquers and paints which are produced chiefly from or contain casein, are effectively protected from attack by fungi with the substances usable according to the present invention.

In addition they can be effectively applied for the protection of the feet against attack by fungi, e.g. by treatment of footwear, inner soles or hosiery. Another application is in the washing of linen in the tourist industry.

The new compounds according to the present invention have the advantage over known similar compounds which have already been suggested and used for the same purpose, for example 2-mercapto benzthiazoles, that they are much less colored. This property opens up to them many forms of application which are closed to the known compounds because of their being colored. In this connection, the 2-oxo compounds are particularly favorable compounds according to the present invention; they are preferred for this reason and because of their more easy accessibility, to the 2-thiones. The oxazoles according to the present invention are particularly stable in light and are weakly colored; they are to be preferred to the thiazoles also because of their particularly easy accessibility from the usual dyestuff intermediate products.

The new compounds are applied to the organic material to be protected generally either by mixing, spraying or impregnating with organic aqueous or aqueous-alkaline solutions of the active ingredients, or with washing, cleansing or rinsing liquors which contain the fungicidal agent either dissolved or dispersed. In general contents of 0.5 to 10 grams of the agent per liter of treatment liquor suffices for effective protection of the material treated. If necessary, the fastness to washing of the fungicidal agent on the treated material can be increased by after-treatment with agents giving off heavy metal. For example copper salts can be used as agents giving off heavy metal. Organic materials to be protected are chiefly cellulose material such as textiles, staple fiber, wood and paper, etc.; reference has already been made to the use of the active ingredients in printing pastes or in lacquers having a casein base.

The following examples illustrate the invention. Where not otherwise stated, parts are given as parts by weight. The temperatures are in degrees centigrade. The relationship of parts by weight to parts by volume is as grammes to cubic centimeters.

EXAMPLE 1

*5,6-dichloro-2,3-dihydro-benzoxazole-2-one*

204 parts of 5-chloro-2,3-dihydro-benzoxazole-2-one are added at 50° to a solution of 158 parts of sodium hydroxide (30.6%) and 32 parts of sodium carbonate in 1000 parts of water. 1160 parts of hot water are then added. In order to obtain a clear solution the mixture is then heated rapidly to 80°. This solution is quickly cooled to 20–25° whereby a part of the formed sodium salt of 5-chloro-2,3-dihydro-benzoxazole-2-one precipitates. 125 parts of gaseous chlorine are now introduced at 20–25° into the suspension over a period of 1¼ hours while stirring well. The reaction mixture is then stirred for 1 hour at 30–35° and finally for 1 hour at 80–85°. Upon cooling to room temperature the precipitate is washed with 700 parts by volume of water and is then crystallized from ethanol. The 5,6-dichloro-2,3-dihydro-benzoxazole-2-one melts at 196–197°.

EXAMPLE 2

*5,6-dichloro-2,3-dihydro-benzthiazole-2-one*

99 parts of 3,4-dichloroaniline hydrochloride are added to 400 parts of sulfur chloride ($S_2Cl_2$) and the mixture is heated to 70–75° until no more gaseous hydrochloric acid evolves. The reaction mixture is then diluted with benzene and the precipitated reaction product is filtered off. It is washed with benzene and dried at 50–55° under reduced pressure. This product is then slurried at room temperature with 1000 parts by volume of water for 2 hours and is then again filtered off. The humid press cake is added at 40–45° to a solution of 66 parts of sodium hydroxide in 400 parts by volume of water. The temperature is raised to 70–75° and the reaction mixture is kept at this temperature for 30 minutes. Undissolved particles are removed by filtration. The filtrate is then made strongly alkaline by the addition of 62 parts by volume of 30% sodium hydroxide. Phosgene is now introduced at 20–30° into this solution of the sodium salt of 2-amino-4,5-dichloro-thiophenol while stirring well until foaming of the reaction mixture begins. The mixture is then acidified with hydrochloric acid to obtain blue reaction on Congo paper. The precipitated 5,6-dichloro-2,3-dihydro-benzthiazole-2-one is filtered off and crystallized from aqueous ethanol. It melts at 222–224°.

The following Examples 3 to 10 inclusive demonstrate the usefulness of the compounds according to the present invention.

EXAMPLE 3

20 parts of 5,6-dichloro-2,3-dihydro-benzthiazole-2-one according to Example 2 are dissolved with the addition of 3.8 parts of caustic soda in 320 parts of ethyl alcohol and a treatment liquor is made with this stock solution by diluting with water which contains 1 gram of active ingredient per liter.

Calico is treated in this treatment liquor for 30 minutes at 60° (liquor ratio 1:20), then centrifuged and dried. The material so treated is protected against mildew spots and rot as the following tests show:

(a) Mildew spot test

Rings of fabric of 9 cm. diameter are placed in Petri dishes on an agar nutrient medium and inoculated with the suspension of a mixture of spores of *Pencillium expansium*, *Stachybotrys atra* and *Aspergillus niger* which contains 40,000 germs per cubic centimeter. The closed Petri dishes are left for 10 days at 29° and then the number of fungi colonies is counted.

(b) Rotting test

Rings of fabric of 3.8 cm. diameter are placed in Petri dishes on an agar nutrient medium which is injected with 0.5 ccm. of a suspension of spires of *Chaetomium globosum*, which contains about 7,000,000 germs per ccm. It is left to breed for 10 days at 28°, the development of the germs is interrupted with an alcoholic thymol solution, the pieces of material are rinsed and dried. The material is then tested in the spot tester according to R. Burgess (Microorganisms and Textiles: The Journal of Applied Bacteriology, 17, 241 (1954)) to see if the strength of the material has been reduced.

(c) Soil burial test

Rings of fabric of 3.8 cm. diameter are buried for 14 days in an earth mixture of a moisture content of 30% and a temperature of 28° prepared from 50% compost, 30% cow dung and 20% sand. The material is then rinsed and dried, and then tested in the spot tester according to Burgess.

In the rotting and soil burial test, the value given is the average of 10 tests. The strength is given in percent of the original strength of the material. The results of these tests are given in Table 1.

EXAMPLE 4

5,6-dichloro-2,3-dihydro-benzthiazole-2-one according to Example 2 is dissolved in ethylene glycol monomethyl ether in a concentration of 1 gram/liter. Calico strips are dipped in this liquor for 30 seconds (liquor ratio 1:20) at room temperature, squeezed out to 100% of their weight and dried. The material so treated is protected against mildew spots and rot. The calico is subjected to the mildew spot test, rotting test and soil burial test as described in Example 3. The results can be seen from Table 1.

EXAMPLE 5

20 parts of 5,6-dichloro-2,3-dihydro-benzoxazole-2-one according to Example 1 are dissolved in 160 parts of ethyl alcohol with the addition of 4.1 parts of caustic soda and a treatment liquor is produced therefrom by dilution with water which contains 1 gram of active ingredient per liter. Calico is dipped for 1 minute in cold solution, squeezed out to 100% of its weight and dried. The material so treated is protected against mildew spots and rot. As described in Example 3, it is subjected to the mildew spot and rotting tests. The results can be seen from Table 1.

EXAMPLE 6

5,6-dichloro-2,3-dihydro-benzoxazole-2-one according to Example 1 is dissolved in so much ethyl alcohol that a concentration of 2 grams per liter is obtained.

Calico strips are dipped in the cold solution for 1 minute (liquor ratio 1:20), squeezed out to 100% of their weight and dried. The material so treated is protected against mildew spots and rot. It is subjected to the mildew spot test and the rotting test. The method is described in Example 3. The results can be seen from Table 1.

TABLE 1

[Of the results of tests in Examples 3 to 6]

| Substance | Content of liquor, grams/liter | Mildew spot test—number of fungi colonies | | | Rotting test/strength, percent | Soil burial test/strength, percent |
|---|---|---|---|---|---|---|
| | | Pen. exp. | Stach. a. | Asp. n. | | |
| Ex. 3 | 1 | 0 | 0 | 0 | 99 | 100 |
| Ex. 4 | 1 | 0 | 0 | 0 | 97 | 96 |
| Ex. 5 | 1 | 0 | 0 | 0 | 100 | |
| Ex. 6 | 2 | 0 | 0 | 0 | 100 | |
| Blank test | 0 | ∞ | ∞ | ∞ | 3 | 7 |

EXAMPLE 7

5,6-dichloro-2,3-dihydro-benzoxazole-2-one according to Example 1 is added to a colophony glue containing 10% dry substance in such a manner that the content is 0.5% of the total weight. The surface of filter paper is glued with this glue in such a manner that after drying, the colophony glue dry weight is 2% of the total weight of the paper. The paper so prepared thus contains 0.04% active ingredient and, due to this content, is protected against mildew spots and mold. To test it, rounds of this paper of a diameter of 9 cm. are laid on wort agar in Petri dishes and the rings are inoculated in the center with *Trichoderma viride* or *Aspergillus niger* or *Fusarium oxysporum* or *Penicillium expansium*. The dishes are left in the thermostat for 5 days at 28°, after which time the spread of growth from the center is measured in millimeters. All tests were performed twice.

The following results were obtained:

| Additive | Trichoderma | | Aspergillus | | Fusarium | | Penicillium | |
|---|---|---|---|---|---|---|---|---|
| | 1 | 2 | 1 | 2 | 1 | 2 | 1 | 2 |
| Without | 25 | 26 | 22 | 20 | 17 | 17 | 9 | 10 |
| 5,6-dichloro-2,3-dihydro-benzoxazole-2-one | 0 | 0 | 0 | 0 | 0 | 0 | 0 | 0 |

EXAMPLE 8

1% of 5,6-dichloro-2,3-dihydrobenzoxazole-2-one according to Example 1 is worked into shoe cream. If leather is treated with this shoe cream, it is protected from mold.

To test this property of the new shoe cream, rings of East Indian goat leather tanned with sumac vegetable extract were used. The rings had a diameter of 3.8 cm. and weighed 400 mg. 100 mg. of shoe cream were applied which corresponds to a content of 2.5% active ingredient, calculated on the weight of the leather. The pieces of leather so prepared were inoculated, left to breed and the values are taken as described in Example 7. All tests were performed twice.

The following results were obtained:

| Additive | Trichoderma | | Fusarium | | Penicillium | | Aspergillus | |
|---|---|---|---|---|---|---|---|---|
| | 1 | 2 | 1 | 2 | 1 | 2 | 1 | 2 |
| Without | 25 | 25 | 10 | 10 | 38 | 38 | 25 | 25 |
| 5,6-dichloro-2,3-dihydro-benzoxazole-2-one | 0 | 0 | 0 | 0 | 0 | 0 | 5 | 5 |

EXAMPLE 9

A 1% benzene solution of 5,6-dichloro-2,3-dihydro-benzoxazole-2-one according to Example 1 is mixed with latex in a ratio of 1:9 and this mixture is poured onto glass slides. After drying, the glass is covered with a latex coating which corresponds to a content of about 1% of active ingredient. Due to this content, it is protected from mold. To test this property, it is inoculated with suspensions of spores of Stemphylium botryosum or Penicillium solitum or Aspergillus niger or Trichoderma viride. A mineral salt solution (Czapek's solution) is the medium for the suspension of spores. The inoculated latex plates are left for 14 days in damp chambers at 28°. It is then determined if, and if so which, organisms could develop.

| Additive | Stemphylium | Penicillium | Aspergillus | Trichoderma |
|---|---|---|---|---|
| Without | +++ | ++ | +++ | ++ |
| 5,6-dichloro-2,3-dihydro-benzoxazole-2-one | 0 | 0 | 0 | 0 |

0 no growth.
++ fair growth.
+++ strong growth.

EXAMPLE 10

Protection of polyvinyl chloride sheets against attack by fungi by using 5,6-dichloro-2,3-dihydro-benzoxazole-2-one according to Example 1 as fungistaticum.

Sheets of the following composition were used:

75 parts of polyvinyl chloride of a K-value according to Sikentscher of 70–72,
25 parts of dioctyl sebacate (as plasticizer),
2 parts of dibutyl tin dilaurate,
0.1 part of 5,6-dichloro-2,3-dihydrobenzoxazole-2-one.

Sheets of the same composition but not containing 5,6-dichloro-2,3-dihydro-benzoxazole-2-one were used for comparison. The sheets were 0.2 mm. thick. The action of the fungistaticum was determined in the following tests:

(1) The polyvinyl chloride sheets (1 x 3 cm.) were dipped for 10 minutes at 30° into a 0.1% solution of the condensation product of diamyl phenol and 15 mols of ethylene oxide in water. The sheets were then laid on mineral salt agar which had been previously incubated for 2 hours of the following composition:

2.0 grams $NaNO_3$
0.5 gram KCl
0.5 gram $MgSO_4$
0.05 gram $FeSO_4$
1.0 gram $KH_2PO_4$
0.05 gram $MnSO_4$
30.0 grams agar
ad 1000.0 grams with aqua dest. pH 6.2–6.5 which had been inoculated with Aspergillus niger E.M.P.A. or Penicillium citrinum or Pseudomonas pyocyanea. The sheets were then left for 10 days at 28°, rinsed with distilled water at 30° and dried for 4 days in a conditioned atmosphere (24°, 60% relative humidity). The elasticity of the material so treated was determined as follows:

The narrow side of the sheets were fixed and a weight of 5 grams was placed on the other end for 15 seconds. This bending is the starting position (a). The weight was then removed and after 15 seconds the position of the sheet was again determined (b). The difference in the two angles (a–b) is termed resistance to bending and is given in degrees. By infestation with micro-organisms, the resistance to bending is lost due to the fungi attacking the plasticizer. The non-inoculated, new sheet has a resistance to bending of 9.25°=100%. The following results were obtained for the sheets protected with 5,6-dichloro-2,3-dihydro-benzoxazole-2-one and for the comparison sheet:

| Additive | Aspergillus | Penicillium | Pseudomonas |
|---|---|---|---|
| Without | +6.25°=58% | +6.75°=63% | +7.25°=78% |
| With | −9.25°=100% | −9.0°=98% | −8.75°=95% |

+=infested.
−=not infested.

(2) Pieces of polyvinyl chloride sheets were buried for 30 days at 28° in an earth mixture having a humidity of 30% and consisting of 50% compost, 30% cow dung and 20% sand. The resistance to bending of the sheets was tested as described under (1). The following results were obtained:

Without additive_____ 2.125°=19%.
With additive_____ 8.25°=92%.

The present application is a continuation-in-part of application Ser. No. 595,119, filed July 2, 1956 (abandoned since the filing of the present application).

Having thus disclosed the invention what is claimed is:
1. 5,6-dichloro-2,3-dihydro-benzoxazole-2-one.
2. 5,6-dichloro-2,3-dihydro-benzthiazole-2-one.

References Cited in the file of this patent
UNITED STATES PATENTS

| | | |
|---|---|---|
| 2,041,712 | Raeck | May 19, 1936 |
| 2,108,712 | Herdieckerhoff et al. | Feb. 15, 1938 |
| 2,724,678 | Gatzi et al. | Nov. 22, 1955 |
| 2,820,042 | Katz et al. | Jan. 14, 1958 |

OTHER REFERENCES

Parken et al.: Chem. Abstracts, vol. 30, p. 1788 (1936).
Desai et al.: Chem. Abstracts, vol. 32, col. 4580 (1938).
Colonna: Chem. Abstracts, vol. 41, col. 754 (1947).
Gaudry et al.: Chem. Abstracts, vol. 43, col. 6615 (1949).
Lespagnol: Chem. Abstracts, vol. 50, col. 3405 (1956).